US 6,534,602 B1

(12) United States Patent
Hofmann et al.

(10) Patent No.: US 6,534,602 B1
(45) Date of Patent: Mar. 18, 2003

(54) HYDROXYL-FUNCTIONALIZED POLYMER COMPOSITIONS

(75) Inventors: George Henry Hofmann, Wilmington, DE (US); Sampson Chun Fai Lee, Scarborough (CA)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/375,046

(22) Filed: Aug. 16, 1999

Related U.S. Application Data

(60) Provisional application No. 60/096,871, filed on Aug. 17, 1998.

(51) Int. Cl.$^7$ ............................................... C08G 61/04
(52) U.S. Cl. .................... 525/539; 525/328.6; 525/366; 525/370; 525/471; 525/521
(58) Field of Search ............................... 525/539, 328.6, 525/366, 521, 370, 471

(56) References Cited

U.S. PATENT DOCUMENTS

| 3,780,140 A | 12/1973 | Hammer | |
|---|---|---|---|
| 4,868,254 A | 9/1989 | Wong | 525/539 |
| 4,929,701 A | 5/1990 | van Broekhoven | 525/539 |
| 4,940,777 A | 7/1990 | Drent | 528/392 |
| 5,300,596 A | 4/1994 | Histky | 525/539 |
| 6,222,009 B1 * | 4/2001 | Grant | 528/485 |

FOREIGN PATENT DOCUMENTS

| EP | 0 322 976 | 7/1989 | C08G/67/02 |
|---|---|---|---|
| EP | 0 372 602 | 6/1990 | C08G/67/02 |
| EP | 0 791 615 | 8/1997 | C08G/67/02 |

OTHER PUBLICATIONS

Kenneth A. Kun, et al., Electron Exchange Polymers. XIV. Steric Hindrance in the Chemical Modification of High Polymers, *Journal of Polymer Science*, XLIV, 383–389, 1960.

PCT International Search Report for International application No. PCT/US99/18805, dated Dec. 15, 1999.

* cited by examiner

*Primary Examiner*—Patricia A. Short

(57) ABSTRACT

A process for reducing the carbonyl group of a polyketone consisting of a carbon monoxide ethylene-based copolymer, comprising reacting a blend of carbon monoxide ethylene-based polymer with a metal alkoxide in a molten condition in proportions to provide a novel polyalcohol. This chemical modification changes the properties of the carbon monoxide ethylene-based polymers and renders them eligible for uses for which the original polymers were not or not very suitable.

2 Claims, No Drawings

HYDROXYL-FUNCTIONALIZED POLYMER COMPOSITIONS

This application claims the benefit of U.S. Provisional Application Ser. No. 60/096,871 filed Aug. 17, 1998.

FIELD OF THE INVENTION

The present invention relates to a process for reducing copolymers containing keto groups (C=O) to polyalcohols using a metal alkoxide compound and novel compositions related thereto.

BACKGROUND OF THE INVENTION

Copolymers containing keto groups as functional groups, also referred to as polyketones, are well-known molding resins and blending resins, e.g., copolymers of ethylene and carbon monoxide commonly used as plasticizers for solid organic polymers such as polyvinyl chloride. It is known that by chemical reaction, the keto groups in polyketones can at least be partly converted into a variety of other functional groups. The chemical modification, changing the keto groups into other functional groups, changes the properties of the polyketones and renders them eligible for uses for which the original polymers were not or not very suitable. Reduction of polyketones produces polyalcohols, which can be used as adhesives or coatings in a number of applications.

Various methods have been used for the reduction of these polyketones to polyalcohols. U.S. Pat. No. 4,929,701 describes the use of copper chromite or nickel catalysts to reduce polyketones to polyalcohols by hydrogenation using a transition metal catalyst. The starting materials are linear alternating polymers of carbon dioxide and at least one ethylenically unsaturated monomer. Terpolymers of carbon monoxide, ethylene, and propylene can also be employed. U.S. Pat. No. 4,868,254 teaches the hydrogenation of polyketones using nickel salts reacted with borohydrides as a catalyst in an alcoholic media. U.S. Pat. No. 5,300,596 discloses an improved process for reducing polyketones containing from 1 to 50% keto group to polyalcohols using borohydride salts where water was used instead of alcohols. In the prior art teaching, the reaction is conducted in a solution or suspension for an extended period of a few hours at least. This type of reaction necessitates the costly process of removing the solvent. Furthermore, the use of borohydrides releases hydrogen gas, potentially a safety hazard due to the inherent flammability of hydrogen.

It would be desirable to conduct the reaction converting the keto group to polyalcohols in such a way that does not require the solvent recovery step. It would also be beneficial to use a reducing agent that does not pose a fire and explosion problem associated with hydride reducing agents. The reduction of keto groups in ketones using such a reducing agent, i.e., a metal alkoxide such as an aluminum alkoxide, lithium alkoxide, sodium alkoxide, or magnesium alkoxide, is well-known in the literature as the Meewein-Pondorff-Verley reaction. The alkoxide attacks only the keto compound and transfers hydride reversibly to the keto acceptor.

However, it has been reported that the reaction will not take place with high polymers. Journal of Polymer Science Vol. XLIV, pages 383–389 (1960) reports that an attempted reaction with polyketones as hydride acceptors and aluminum isopropoxide (AIP) catalyst failed, showing no change in the starting polyketone material. The polymer was combined with AIP and butanol-2 or 1,2-diphenylethanol, or isopropanol in a dry flask and heated under reflux. There was no evidence of acetone formation. The polyketones, both linear and crosslinked, did not at all participate in the Meewein-Pondorff-Verley reaction even under forcing conditions. These reagents worked with small molecules and not with polymers. In fact, the authors concluded that the failure of reaction must be primarily due to the steric hindrance that is presented by the long chains of the high molecular weight polymer groups.

It has been surprisingly found that contrary to the prior belief, copolymers containing keto groups can be reduced to polyalcohols by using aluminum alkoxides.

SUMMARY OF THE INVENTION

The invention provides a novel polyalcohol composition comprising:
  a) one or more carbonyl (C=O) groups;
  b) one or more secondary alcohol (CHOH) groups; and
  c) a by-product aluminum trihydrate.

The polyalcohol composition is obtained by reduction of carbonyl groups in polyketones having between 0.1–50 mole % carbonyl (C=O) using metal alkoxides as the reagents, producing aluminum trihydrate as a by-product.

Further, the invention provides a process for the reduction of polyketones to produce polyalcohols comprising:
  a) mixing a carbon monoxide vinyl-based copolymer with a metal alkoxide in molten condition to form a metal salt of the copolymer;
  b) hydrolyzing said metal salt to form a polyalcohol; and
  c) recovering said polyalcohol product.

The invention also provides a process for the reduction of polyketones to produce polyalcohols comprising:
  a) mixing a carbonyl containing copolymer in molten condition with a metal alkoxide to form a metal salt as a side product in the presence of an excess amount of:
    i) an isopropyl alcohol; or
    ii) an alcohol substituted with a bulky alkyl group; or
    iii) a ketone which is substituted with a bulky alkyl group,
  b) hydrolyzing said metal salt to form a polyalcohol; and
  c) removing said side-product acetone and recovering said polyalcohol product.

DETAILED DESCRIPTION OF THE INVENTION

A process has now been found for the reduction of keto groups in polyketones having between 1–50 mole % keto groups using metal alkoxides as the reagents, producing polyalcohols. Accordingly, the present invention provides a continuous process for the reduction of a polyketone polymer, the process comprising: reacting the polymer in molten condition with a metal alkoxide (preferably aluminum alkoxide) as a reagent, liberating acetone and thus forming a metal alkoxide salt of the polymer; hydrolyzing said metal salt forming a polyalcohol; and recovering said polyalcohol product.

According to another aspect of the invention, the reduction reaction of the polyketone polymer in molten condition with a metal alkoxide (preferably aluminum alkoxide) is carried out in the presence of a stoichiometric or excess amount of: i) isopropyl alcohol, ii) an alcohol which is substituted with a bulky alkyl group; or iii) a ketone which is substituted with a bulky alkyl group, which reacts with the metal alkoxide salt of the polymer to re-generate metal alkoxide forming a polyalcohol.

There is also provided a novel polyalcohol composition from the reduction reaction, comprising un-reacted keto groups and hydroxyl function groups, and the by-product aluminum trihydrate resulting from aqueous hydrolysis.

Polyketones. One class of polyketones capable of reacting with metal, e.g. aluminum, alkoxides to form polyalcohol compositions include homo and copolymers of alkyl vinyl ketones. Comonomers used in conjunction with these keto group-containing vinyl monomers can include other vinyl monomers, including ethylene, propylene, styrene, acrylates, methacrylates, vinyl chloride and vinyl flouride.

Another class of polyketones in the reduction reaction according to the present invention includes ethylene/carbon monoxide copolymers, carbon monoxide/alpha olefin copolymers, carbon monoxide/ethylene/alpha olefin copolymers, and ethylene terpolymers of the general formula E/X/CO. In the E/X/CO formula, E is the ethylene, X is a "softening" monomer such as, for example, vinyl acetate or an acrylic ester, and CO is the carbon monoxide. An example is an ethylene/carbon monoxide/acrylate copolymer where X is a $C_1$–$C_{10}$ n-alkyl acrylate, such as E/nBA/CO terpolymers where nBA stands for n-butyl-acrylate.

Reagents Metal Alkoxides. The metal alkoxides include alkoxides bearing aluminum cations such as aluminum-t-butoxide, aluminum cyclohexoxide, aluminum ethoxide, aluminum isopropoxide. However, alkoxides exhibiting good hydride-donating tendencies such as lithium isopropoxide, sodium alkoxide, and magnesium alkoxide may also be used for the reduction. Reagent aluminum alkoxides are commercially available from common scientific and chemical supplies sources. The most preferred aluminum alkoxide is aluminum isopropoxide (AIP).

Product Polyalcohols. The novel polyalcohol produced according to the process of the present invention is a polymer containing one or more secondary polyalcohol units, one or more carbonyl groups, i.e., some of the un-reacted carbon monoxide, ethylene, and the by-product aluminum trihydrate from the reduction reaction employing aluminum alkoxides as the reagent. The composition preferably contains about 0.1 to 49 wt. % carbonyl groups, about 0.1 to 52 wt. % secondary alcohol groups, and about 0.01 to about 20 wt. % of by-product aluminum trihydrate. More preferably, the composition also contains ethylene-based (substituted) vinyl monomer, most preferably selected from the group consisting of: vinyl halides, styrene, propylene, alkyl methacrylates, alkyl acrylates, vinyl acetate, vinylidene flouride, tetraflouro ethylene, methyl vinyl ketones, and acrylonitrile.

Polyketones, such as linear alternating copolymers of carbon monoxide and an ethylenically unsaturated hydrocarbon, can be practically manufactured in a process as described in U.S. Pat. No. 4,940,777 in the presence of a catalyst composition, preferably formed from a palladium compound, particularly palladium carboxylates, the anion of certain strong non-hydrohalogenic acids and a bidentate ligand of nitrogen. Polymerization takes place at a reaction temperature of about 15 to 140° C. and pressure from 20 to 150 bar. Subsequent to reaction, polymer product is recovered from mixture by well-known methods such as filtration and decantation.

Another process for manufacturing polyketones is as described in U.S. Pat. No. 3,780,140. It is a free-radical initiated, high pressure process, wherein the monomers are fed into a large, continuously stirred reactor, normally in the absence of solvents, although occasionally the addition of a small amount of a suitable solvent helps avoid polymer deposit on the inner wall of the reactor. The reactor contains a mix of polymer and monomers in readily ascertainable proportions. The flow of monomers is adjusted to give constant mole ratio, and the feed rate is set to be the same as the discharge of the polymer and of unchanged monomers from the reactor. Allowance should be made for the different rate of polymerization of the various co-monomers, so that none is depleted. Conversion is the percentage of the polymer in the polymer/monomer mix and can be directly measured by determining the amount of polymer present in the exit stream. The free-radical polymerization catalyst employed in the production of the polyketone for use in the present invention can be any of those commonly used in the polymerization of ethylene, such as the peroxides, the peresters, the azo compounds, or the percarbonates. The reactor is typically operated at a temperature of about 140–225° C., and a pressure of about 20,000–35,000 psi (i.e., 137895 kPa to 241316 kPa). The heat of polymerization is applied to heating up the cool feed monomers, so that a constant temperature is maintained in the reactor. The reactor pressure is reduced as the mixture of monomers and copolymer exits the reactor and flows into a separator. Molten copolymer leaves the separator in a stream, from which it is cooled and further processed such as being cut into suitable sized particles.

Batch Process. The present invention can be practiced in either a batch or continuous process, and preferably in a continuous process. For a batch process, the present invention is practiced by first melting the keto containing polymer in a mixer equipped with a stirrer and blanketed with an inert gas. The temperature of the mixer should be sufficient to melt the polymer, but below its degradation temperature and preferably above 135° C. To this molten polyketone polymer is added a metal, e.g. aluminum, alkoxide. Alternatively, the aluminum alkoxide is mixed together with the starting polyketone and the mixture is heated until molten.

The aluminum alkoxide is applied at a ratio of 1:1 to 0.1:10 molar equivalents of the aluminum alkoxide to the number of carbonyl groups that need to be reduced. The aluminum alkoxide is preferably aluminum isopropoxide (AIP), and the preferred molar equivalent ratio is determined by percent conversion of carbonyl groups to hydroxyl desired. A reaction is noted almost immediately when the polymer mass becomes dry and fluffy. The next acidification step is accomplished by any process known in the art, such as adding excess water or acidified water in a quantity that is at least three times, and preferably ten times the molar amount of metal alkoxide that was added to the reaction. If an aqueous acid solution is used, the preferred composition is 1–5 g acetic acid or phosphoric acid per 100 mL of water.

Continuous Process. Alternatively, the reaction can be carried out in a continuous process, using continuous melt blending equipment such as single and twin screw extruders, continuous kneaders, and continuous mixers. The equipment is preferably a twin screw extruder of either a co-rotating intermeshing or counter-rotating non-intermeshing configuration. The extruder should be sufficiently long of at least 28 L/D to ensure that there is enough residence time for reaction.

In one embodiment of the continuous process, the polyketone is fed in at the same time along with the aluminum alkoxide. In another embodiment of the continuous process, polyketone is first melted in the extruder, then molten aluminum alkoxide is injected into the polymer melt. The extruder is set at temperature that is sufficient to melt the polymer, but below its degradation temperature. If the polymer is low-melting, the extruder temperature should be no lower than 135° C. to ensure that the reaction will take place fast enough during the time the polymer has to react in the extruder. As in the batch process, the aluminum alkoxide is applied at a ratio of 1:1 to 0.1:10 molar equivalents of the aluminum alkoxide to the number of carbonyl groups that need to be reduced and the preferred aluminum alkoxide being an aluminum isopropoxide.

The resulting aluminum salt of the copolymer will exit the crosshead extruder as a crumb and be collected in a cyclone separator for the next hydrolysis step as described in the batch process above. Or the hydrolysis reaction can be conducted within the extruder itself. To carry out the hydrolysis in the extruder, water or acidified water is fed into the polymer melt downstream from the feed throat of the extruder, at a rate equivalent to a quantity of water that is at least three times the molar amount of metal alkoxide that was added to the reaction. The injection position should be at an appropriate point to give enough length to allow the aluminum alkoxide time to react with the polymer before it is hydrolyzed by water. There should also be sufficient time between the point of water injection to the exit point of the extruder to give the hydrolysis reaction sufficient time to reach completion so that all the cross-linked alkoxide units are converted to hydroxy units.

In another embodiment of the continuous process, the reaction is preferably forced further or moderated in the presence of a lower alcohol, e.g. isopropanol (IPA). In this embodiment, excess IPA is injected immediately after the melting zone of the extruder at a rate between 10–1000 times the stoichiometric amount of carbonyl functionality being present in the starting material. The aluminum alkoxide is fed into the extruder with the polymer, or it can be fed into the extruder as a solution in the IPA for reaction with the molten polymer. Water or acidified water is fed into the polymer melt downstream from the feed throat of the extruder as described above for the hydrolysis reaction to hydrolyze aluminum alkoxide that is regenerated.

In yet another embodiment, the reaction is forced further or moderated in the presence of: i) an alcohol which is substituted with a bulky alkyl group, preferably t-butyl alcohol or cyclohexanol, or ii) a ketone which is substituted with a bulky alkyl group, preferably cyclohexanone. In this embodiment, the aluminum alkoxide is fed into the extruder with the polymer if the polymer melts below the melting point of the aluminum alkoxide. The temperature of the extruder is set such that the polymer is allowed to melt, but not the aluminum alkoxide. The alcohol or ketone is then injected into this heterogeneous mixture of solid aluminum alkoxide and polymer melt. At a stage downstream of this injection point, where the alcohol or ketone is thoroughly mixed throughout the polymer melt, the temperature is increased sufficiently to melt the aluminum alkoxide. Water or acidified water is fed into the polymer melt downstream from the feed throat of the extruder as described above.

Alternatively, the aluminum alkoxide can be fed into the extruder as a solution in the bulky alcohol or bulky ketone before reaction with the molten polymer, with water or acidified water being fed into the polymer melt downstream from the feed throat of the extruder to hydrolyze the aluminum alkoxide.

In the continuous embodiments, a vacuum port is optionally introduced just before the polymer exits the extruder to remove water, acidified water, IPA, bulky alcohol, bulky ketone, or other volatile residuals such as acetone. The reacted polymer leaving the extruder is cooled and further processed such as being cut into suitable sized particles or pellets.

Carbon-13 NMR of the product polymer from either the batch or continuous process reveals a new peak at about 71 ppm, downfield of the carbon signal from a reference standard of tetramethylsilane, characteristic of the secondary alcohol functionality produced by the reaction. The presence of the polyalcohol product can also be confirmed by proton NMR. The NMR reveals a new peak at 3.7 ppm, consistent with the expected position of an aliphatic secondary alcohol signal.

The invention now being generally described, the same will be better understood with reference to the following embodiments and examples, which are intended for purposes of illustration only and not to be limiting of the invention except where so indicated.

Batch Examples

In the examples, the polyketone used as a starting material is of the formula E/X or E/X/CO, where E is the ethylene, CO is the carbon monoxide, and X is n-butyl acrylate. The polymers were prepared by the method of free-radical high-pressure polymerization as described above and in U.S. Pat. No. 3,780,140.

For the batch process, a Haake Model System 90 mixer equipped with roller blades and nitrogen source for blanketing the mixture was used for the reduction reaction. The hydrolysis reaction was carried out in a container equipped with a stirrer and an excess of acidified hot water. Alternatively for some of the examples, the salt was left in the Haake mixer and excess acidified water was added dropwise at low rpm until the hydrolysis was complete.

For all examples the presence of the polyalcohol product was confirmed by a Carbon-13 NMR of the product polymer, showing a new peak at about 71–72 ppm, characteristic of the secondary alcohol functionality produced by the reaction. Alternatively, the presence of the polyalcohol product was confirmed by proton NMR.

Examples 1–2

In the Haake mixer, a copolymer containing 13 wt. % carbon monoxide and ethylene constituting the balance was prepared as described above. The polymer was added first and mixed at about 110° C. and at a mixer setting of 200 rpm until molten. The AIP was then added and the mixture is blended at a melt temperature of about 150° C. A rapid reaction was noted in about 5 to 10 minutes as the polymer mass became dry and fluffy. The melt temperature was raised to about 225° C. and mixing was continued for about another 30 seconds. The results of the reduction reactions are shown in Table 1 below:

TABLE 1

| Example | ECO Wt % | AIP wt % | % carbonyl reduction (actual) |
| --- | --- | --- | --- |
| 1 | 95.2 | 4.8 | 8 |
| 2 | 90.9 | 9.1 | 17 |

Examples 3–6

An E/nBA/CO terpolymer containing about 10 wt % carbon monoxide, 30 wt. % n-butyl-acrylate, and ethylene constituting the balance with a melt index of about 100 was used for Examples 3–6. The copolymer is added to the Haake mixer and mixed at about 110° C. and at a mixer setting of 200 rpm until molten. The aluminum isopropoxide is then added and the mixture is blended at a melt temperature of about 150° C. The melt temperature was raised to about 225° C. or less and mixing was continued for about 30 seconds after the reaction started, as indicating by the polymer mass formed. The results of the reduction reaction are shown in Table 2 below:

TABLE 2

| Example | EnBACO wt % | AIP wt % | % carbonyl reduction (actual) |
|---|---|---|---|
| 13 | 99 | 1 | 3 |
| 14 | 98 | 2 | 4 |
| 15 | 96.2 | 3.8 | 6 |
| 16 | 94.3 | 5.7 | 8 |

Example 7

A commercial sample of ethylene, carbon monoxide (E/CO) copolymer, sold by Shell Chemical, Inc. as Carilon D26VM100, containing 50% CO, was added to the Haake mixer and mixed at 240° C. and 200 rpm until molten. The aluminum isopropoxide (1.2 wt. %) was then added and the mixture blended at mix temperature until the torque levels out. After an additional 30 seconds, the aluminum alkoxide salt was removed for hydrolysis in hot aqueous acetic acid. NMR analysis indicated that 0.9% of the carbonyls were converted to hydroxyl groups.

Example 8

Another class of polyketones capable of reacting with metal alkoxides to form polyalcohol compositions include home and copolymers of alkyl vinyl ketones. A sample of poly(vinyl methyl ketone), supplied by Aldrich Chemicals, melting at 160° C. and containing 40% CO was added to a Haake mixer and mixed at 180° C. and 200 rpm until molten. The aluminum isopropoxide (1.2 weight %) was then added and the mixture blended at mix temperatures until the torque levels out. After an additional 30 seconds, the aluminum alkoxide salt was removed for hydrolysis in hot aqueous acetic acid. NMR analysis indicated that 0.1 % of the carbonyl groups were converted to hydroxyl groups.

Continuous Process Runs. In the first set of continuous runs, an E/nBA/CO terpolymer containing about 10 wt % carbon monoxide, 32 wt. % n-butyl-acrylate, and ethylene constituting the balance was used as the starting polyketone for the continuous process runs. The polymer was fed at a rate of 0.080 kg/min into a 25 mm co-rotating intermeshing Berstorff extruder operating at 250 rpm. The barrel temperatures were set at about 150° C. Aluminum isopropoxide is fed into the extruder at a rate of 0.0019 to 0.11 kg/min (or between 2.4 to 24 wt %), with the range varying depending on the degree of carbonyl reduction desired. Two-thirds downstream from the extruder feed inlet, water or an aqueous acid solution of 1–5 g acetic acid or phosphoric acid per 100 mL of water is injected into the melt at a rate of 0.002–0.01 liter/min. The polymer strands exiting the extruder are pelletized.

In the second set of continuous runs demonstrating the alternate embodiment, the same E/nBA/CO terpolymer containing about 10 wt % carbon monoxide, 30 wt. % n-butyl-acrylate, and ethylene constituting the balance was used. The polymer was fed at a rate of 0.080 kg/min into a 25 mm co-rotating intermeshing Berstorff extruder operating at 250 rpm. The barrel temperature was set at about 170° C. Aluminum isopropoxide is fed into the extruder at a rate of 0.0019 to 0.11 kg/min (or between 2.4 to 24 wt %), with the range varying depending on the degree of carbonyl reduction desired. One third downstream from the extruder polymer feed inlet, isopropyl alcohol was injected into the melt at a rate of 0.009 liter/min. Two-thirds downstream from the extruder feed inlet, hot water or an aqueous acid solution of 1–5 g acetic acid or phosphoric acid per 100 mL of water is injected into the melt at a rate of 0.002–0.01 liter/min. The polymer strands exiting the extruder are pelletized.

In another set of continuous runs, the same E/nBA/CO terpolymer was used. The E/nBA/CO terpolymer and AIP were fed together into a 25 mm co-rotating extruder operating at a screw speed of 200 rpm. The feed rate of the E/nBA/CO terpolymer and AIP were 0.080 and 0.0058 kg/min respectively. The first third of the extruder was set at 120° C. and the temperature of the remaining sections of the extruder were set at 150° C. t-butanol was injected at a rate of 0.00546 l/min into the extruder at a point one third downstream of the extruder where the E/nBA/CO terpolymer had already melted. An aqueous solution of 5 g acetic acid/100 g water was injected into the extruder at a point two-thirds downstream of the polymer feed inlet. The polymer strands exiting the extruder were pelletized. The pellets were heated over night at 65° C. under a vacuum to remove any residual alcohol. Proton NMR of this material showed that 7% of the carbonyl groups had been reduced to secondary alcohol groups.

In the fourth set of runs, the same procedure described above was repeated except that cyclohexanone was used in place of t-butanol. The cyclohexanone was fed into the extruder at a rate of 0.00296 l/min. Proton NMR of the product of this process showed that 2% of the carbonyl groups had been reduced to secondary alcohol groups.

In all runs, carbon-13 NMR of the product polymer confirmed the characteristics of the secondary functionality produced by the reduction reaction with a new peak at about 71 ppm. The NMR also revealed a new peak at 3.7 ppm, consistent with the expected position of an aliphatic secondary alcohol signal.

As is apparent from the foregoing description, the materials prepared and procedures followed relate only to specific embodiments of the broad invention. While forms of the invention has been illustrated and described, modifications can be made without departing from the spirit and scope of the invention. Accordingly, it is not intended that the invention be limited thereby.

What is claimed is:

1. A process for the reduction of polyketones to produce polyalcohols comprising:

a) mixing a polyketone copolymer with a metal alkoxide in molten condition forming a metal salt of the polyketone copolymer;

b) hydrolyzing said metal salt to form a polyalcohol; and c) recovering said polyalcohol product, wherein said polyketone has from about 0.1 mole % to about 50 mole % carbonyl units and wherein said polyketone is terpolymer of carbon monoxide, alkyl acrylate, and ethylene.

2. The process of claim 1, wherein said metal alkoxide is aluminum isopropoxide.

* * * * *